(No Model.)	2 Sheets—Sheet 1.

J. B. HALFIN.
INCUBATOR.

No. 499,989.	Patented June 20, 1893.

Witnesses
Robert Emmitt
G. M. Rea.

Inventor
John B. Halfin.
By James L. Norris.
Atty.

(No Model.) 2 Sheets—Sheet 2.

J. B. HALFIN.
INCUBATOR.

No. 499,989. Patented June 20, 1893.

Witnesses:
Robert Everitt
G. M. Rea

Inventor:
John B. Halfin
By
Attÿ.

UNITED STATES PATENT OFFICE.

JOHN B. HALFIN, OF QUINCY, ILLINOIS, ASSIGNOR TO JOHN G. NOTTER AND JOHN G. NOTTER, TRUSTEE, OF SAME PLACE.

INCUBATOR.

SPECIFICATION forming part of Letters Patent No. 499,989, dated June 20, 1893.

Application filed December 20, 1892. Serial No. 455,776. (No model.)

*To all whom it may concern:*

Be it known that I, JOHN B. HALFIN, a citizen of the United States, residing at Quincy, in the county of Adams and State of Illinois, have invented new and useful Improvements in Incubators, of which the following is a specification.

This invention relates to incubators and has for one of its objects to provide a simple and effective apparatus in which both the temperature and humidity of the air admitted to the egg chamber will be automatically regulated at all times.

Another object of the invention is to provide for the ventilation of the apparatus in such manner as to prevent sudden drafts and consequent liability of chilling the eggs and to maintain a constant pressure of warm moist air within the egg chamber.

The invention also has for one of its principal objects to provide an incubator in which the currents of heated and moist air will have a positive upward direction from the boiler or source of heat to the egg chamber and yet be so deflected and controlled as to be caused to enter the egg chamber uniformly from all sides without coming immediately in contact with the under sides of the eggs, which are thus shielded from the direct upward action of vertical heat currents.

To these ends and for other purposes which will be apparent from the following description, my invention consists in the peculiar features of construction and novel combinations of devices in an incubator as hereinafter more fully set forth.

Figure 1:
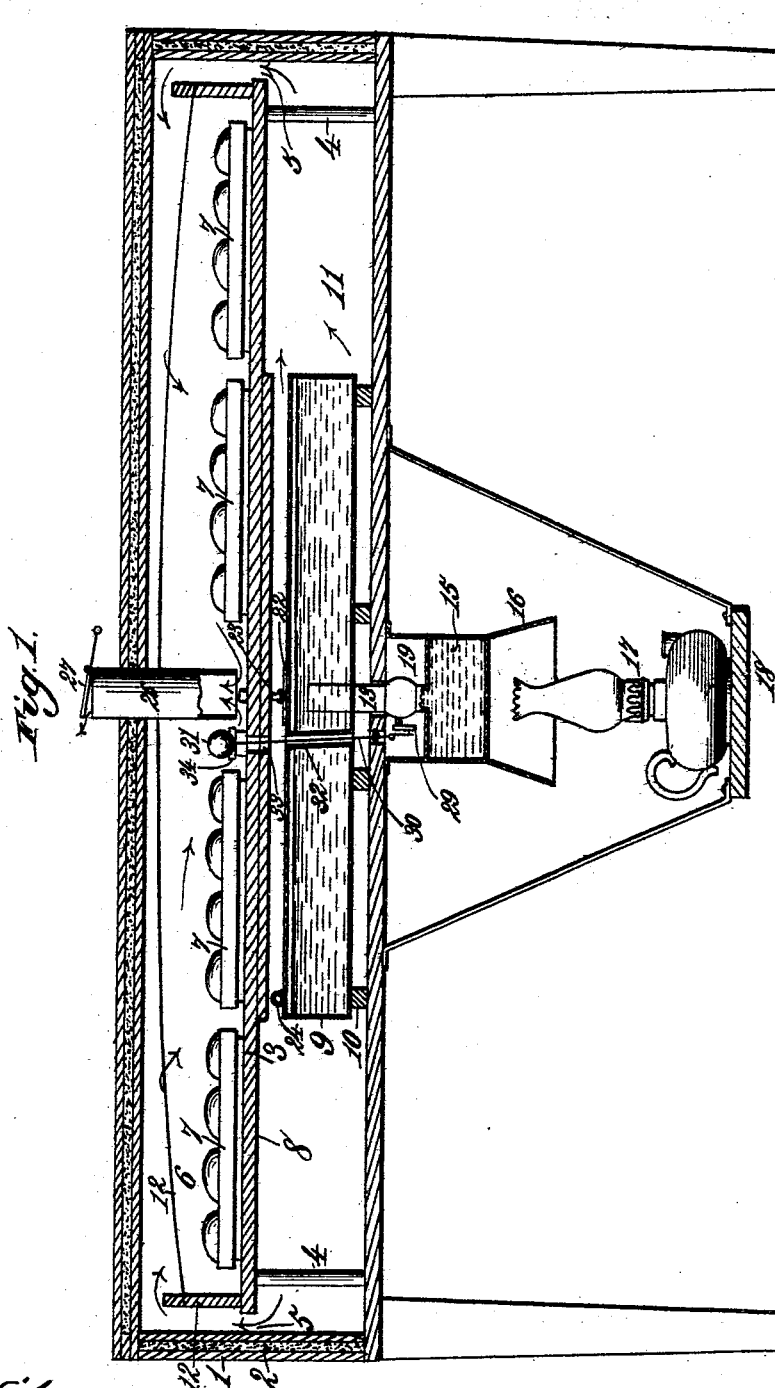
Figure 2:
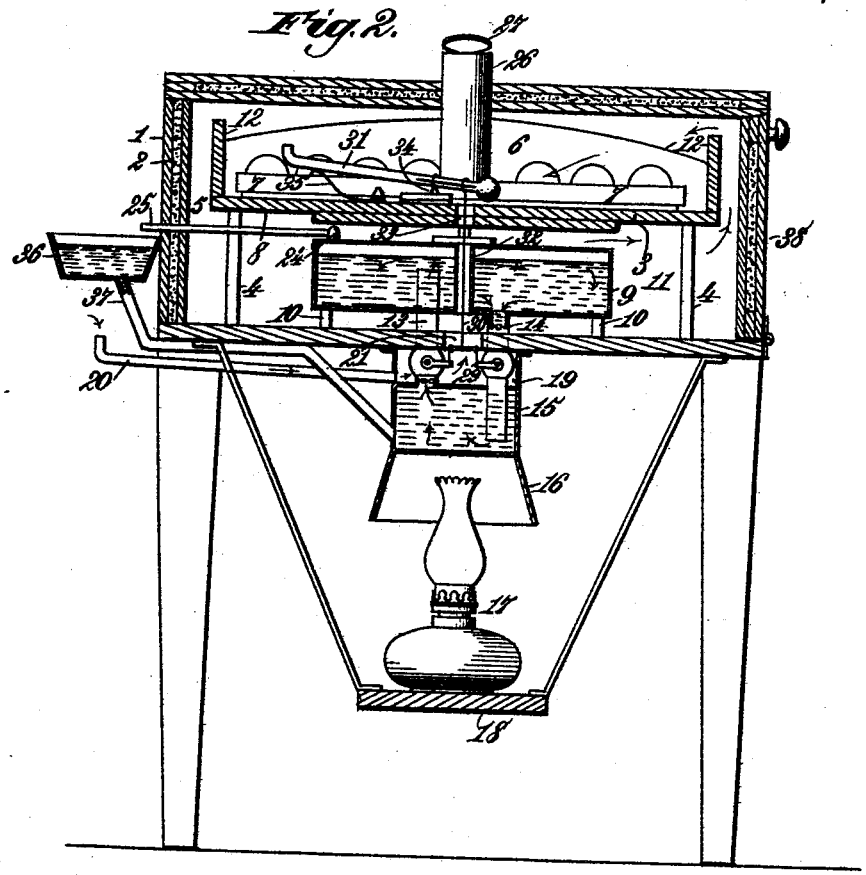
Figure 3:
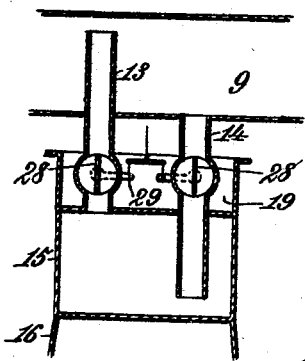

In the annexed drawings illustrating the invention—Figure 1, is a vertical longitudinal section of my improved incubator. Fig. 2, is a vertical transverse section of the same. Fig. 3, is a detail view.

Referring to the drawings, the numeral 1 designates the incubator body or casing which is preferably in the form of a parallelopiped. As shown in Figs. 1 and 2 the side walls, end walls and top of the casing 1 are made double and in each is a non-conducting packing 2 of sand or other heat retentive substance for the purpose of obviating danger from any sudden fall of temperature in the outside atmosphere during the process of incubation. The bottom or floor of the casing 1 may be in the form of a stand or table having suitable legs or supports as shown.

Within the incubator casing, at about its center, is a rectangular horizontal shield or deflecting diaphragm 3, which may be supported on uprights 4 at or near its corners. This shield or deflector 3 does not extend to the sides and ends of the incubator but is of such dimensions as to leave on all sides a passage 5 for the ascent of heated air currents between the edges of the shield and the walls of the incubator.

The space above the horizontal shield or diaphragm 3 constitutes an egg chamber 6, the eggs being placed in trays 7 supported on the shield or diaphragm, as shown. These trays 7 may be of any suitable slatted or open work construction. The shield 3 is preferably constructed of a thick board covered on the under side with a layer of heavy paper or similar non-conductor 8 and is designed to protect the eggs from direct upward radiation of heat and to cause the heated air currents to spread toward the sides and ends of the shield and thence ascend through the surrounding passage 5 into the egg chamber. As shown in Figs. 1 and 2 the central portion of the shield 3 is preferably of double thickness above the top of a hot water tank or radiator 9 which is supported on blocks 10 in the lower part of the incubator casing. This lower part of the incubator, below the horizontal shield 3, forms a heat distributing chamber 11 which communicates on all sides, through the passage 5, with the egg chamber 6 above said shield. The top of the horizontal shield or diaphragm 3 is provided on all sides with a fender 12 which extends entirely around the egg chamber and is so formed as to equalize the influx of heat to the egg chamber, the said fender being highest at the center of each side and lowest at the four corners of the shield or farthest from the tank.

The hot water tank 9 is situated directly beneath the horizontal shield or diaphragm 3 and communicates through pipes 13 and 14 with a boiler 15 that is located outside and beneath the body of the incubator. On its under side the boiler 15 is provided with a hood 16 for detaining and rendering more effective the heat from a lamp 17 that may be supported beneath the incubator in any convenient manner. For the purpose of supporting the lamp a shelf 18 may be suspended or otherwise arranged beneath the incubator, as shown. Through the circulation of hot water from the boiler to the tank and back the tank 9 is caused to act as a radiator or reservoir and distributer of the heat generated in the boiler. The hot water pipe 13, which conducts hot water from the boiler to the tank, is extended from the top of the boiler 15 through the bottom of the incubator and then into and nearly to the top of the tank 9 where it constantly discharges its burden of hot water into the tank; while the cool water in the tank sinks and finds its way back to the boiler through the return pipe 14 which extends from the bottom of the tank into and nearly to the bottom of the boiler.

Between the boiler 15 and the under side of the incubator body or casing 1 is an air heating chamber 19 provided with any suitable air inlet which may be in the form of a pipe 20 of such length and arrangement as to prevent a quick or sudden draft. The air heating chamber 19 surrounds portions of the hot water circulation pipes 13, 14 and communicates with the heat distributing chamber 11 through one or more openings 21 in the bottom of the incubator. This air heating chamber 19 is preferably in the form of a cylinder or drum that may also serve to connect the boiler 15 to the bottom of the incubator. By thus providing an air heating chamber 19 between the boiler and incubator the air admitted to the interior of the incubator is previously raised to a high temperature and all danger of the eggs being chilled by drafts of cold air is obviated. This arrangement also provides an effective ventilation through the constant admission of fresh hot air.

In the center of the closed top of the hot water tank or radiator 9 is an opening that is automatically controlled by a valve disk 22 on the top of which is loosely supported a block 23 of wood or other suitable hygroscopic material. This hygroscopic block 23 is so adjusted and arranged between the top of the vertically movable valve disk 22 and the under side of the fixed horizontal shield 3 as to be capable of having a bearing against each when the block is expanded by absorption of moisture. While the air in the incubator is in such a state of humidity as to cause sufficient expansion of the block 23 to hold the valve disk 22 down no more vapor can pass into the incubator from the hot water tank; but when the air within the incubator becomes dry and moisture is needed the block 23 will contract and permit the pressure within the tank to raise the valve 22 sufficiently to allow the passage of vapor from the tank to the interior of the incubator. To prevent an overpressure of vapor in the hot water tank while the valve disk 22 is fastened down one end of the tank is provided with a safety valve 24 having an outlet pipe 25 through which the surplus vapor is allowed to escape into the atmosphere outside of the incubator.

The top wall of the incubator is provided with a vertical flue 26 the lower end of which is extended downward on a level with the bottom of the eggs in the egg trays 7 that are supported on the horizontal shield or diaphragm 3 as shown. By this arrangement of the lower end of the flue 26 with relation to the eggs in the trays the ascending currents of heated air and vapor entering the egg chamber 6 and passing from all sides to the top thereof are compelled to descend upon the eggs and to the level of the lower end of said flue 26 in order to escape from the incubator. The top of the flue 26 is provided with a damper 27 so arranged as to permit any required adjustment for the purpose of retarding or choking the escaping currents of air and vapor, and thus obtain the requisite pressure of warm air on the eggs.

The pipes 13 and 14, through which the tank 9 and boiler 15 communicate, are each provided with a cut off cock or valve 28 having an operating lever 29, as shown. The valve levers 29 are connected to the lower end of a rod 30 the upper end of which is connected to a thermostat 31 that may be mounted at a convenient point on the upper side of the shield 3, within the egg chamber. As shown the rod 30 is extended through one of the openings 21 between the air heating chamber 19 and tank chamber or heat distributing chamber 11 and thence through a tubular passage 32 formed in the tank 9 and also through an opening 33 in the horizontal shield. The thermostat 31 is preferably in the form of a curved glass tube having a bulb at one end and partly filled with mercury. This thermostat tube 31 is poised on a fulcrum 34 in such manner that when the mercury expands by increasing heat the tube will be thereby tipped and thus cause the rod 30 to actuate the connected valves 28 in a closing direction. The valves 28 are fitted so loosely that the slightest impulse of power will operate them.

For the purpose of enabling the thermostat to be normally set to hold the temperature of the apparatus at incubating heat the tube 31 should be so connected to its fulcrum or bridge 34 as to be capable of adjustment thereon and the said fulcrum or bridge should be made to adjustably slide in a groove or way formed in the top of the shield 3 or other support. Should a rise in the temperature of the outside atmosphere occur, rendering less heat necessary within the incubator, the expansion of mercury in the thermostat will cause it to tip and shut off the circulation through the hot water pipe 13 and return pipe 14 and on the other hand should the outside temperature fall and more heat be required within the incubator the contraction of the mercury will cause the bulb end of the thermostat tube to tilt gradually downward and open the valves 28 thus restoring the circulation of hot water in the boiler and connected tank or radiator. In order to prevent the thermostat from tilting suddenly a weak spring 35 is provided at one end.

Outside the incubator is a filling tank 36 having a pipe 37 that connects with the boiler. The top of this filling tank 36 is on a level with the normal water level in the inner tank or radiator 9 and therefore serves as an indicator of the height of water within the apparatus. When a renewed supply of water is needed in the inner tank 9 it is to be poured into the outer tank 36 whence it will find its level through the boiler and the pipes that connect with the inner tank. The outer tank 36 also serves as a vent for the hot water in the boiler when the valves 28 are closed by the action of the thermostat.

It will be observed that while fresh air is constantly supplied to the incubator through the ventilating pipe 20 leading into the air heating chamber 19 the arrangement of the valved exit flue 26 with its lower end extended downward to the level of the bottom of the eggs in the trays is such that any sudden or rapid escape of warm moist air from the egg chamber is effectually prevented. The fresh air admitted to the air heating chamber 19 becomes rapidly and thoroughly heated by proximity to the upper side of the boiler 15 and passes upward through the openings 21 in the bottom of the incubator and thence beneath and around the hot water tank or radiator 9 which acts as a heat reservoir and distributer. While in contact with this tank or radiator 9 the air will therefore become still further heated. The horizontal shield or deflecting diaphragm 3 cuts off and prevents any direct upward hot air currents from the surfaces of the tank 9 and thus protects the eggs in the trays 7 from direct vertical heat. The heated air is thus detained in the chamber 11 for a sufficient length of time to have its temperature equalized and to permit absorption of any vapor that may escape from the hot water tank at the valve 22 if the air is not already in such a state of humidity as to cause expansion of the hygroscopic block 23 and keep the valve closed. By means of the horizontal shield or deflector 3 the uniformly heated air is caused to spread outward to both sides and ends of the heat distributing chamber 11 and rises thence into the egg chamber 6 in vertical currents through the passages 5 at both sides and both ends of the incubator. In its ascent through these passages 5 the hot air is prevented from coming in immediate contact with the eggs in the trays 7 by reason of the vertical fender 12 supported around the edges of the shield 3 and surrounding the egg trays. By making this fender lowest at the corners of the shield 3 and higher at intermediate points the influx of heat to the egg chamber 6 is still further equalized. The horizontal shield 3 and surrounding vertical fender 12 thus cause the heated air currents to pass in contact with the side and end walls of the incubator casing and against the top thereof and from the walls and top the warm moist air is then deflected downward onto the eggs in the trays.

The exit flue 26 is preferably located in the center of the incubator top and, as before remarked, its lower end is extended downward to about the level of the under side of the eggs in the trays so as to cause the warm, moist air to surround and be retained in contact with the eggs for some time before being permitted to escape from the incubator. By means of the valve or damper 27 the escape of air and vapor through the flue 26 can be still further retarded so that with the continued access of heated air from the chambers 11 and 19 any desired pressure can be maintained in the egg chamber.

The non-conducting or heat retentive packing 2 in the walls and top of the incubator serves to prevent chilling from any sudden fall of temperature in the outer atmosphere. The heat currents from the lamp to the boiler and air heating chamber and thence to the heat distributing chamber and egg chamber are all upward.

In the egg chamber a pressure of heat upon the eggs is caused by the constant influx of heat from below which finds no free outlet and of necessity must be compressed in order to be forced downward within the egg chamber to a level with the bottom of the flue. There is thus no coaxing down of heat from an elevated tank, but all the currents of heat are positive and upward though shielded from coming in direct or immediate contact with the under sides of the eggs. By retaining a wall of warm humid air all about the eggs and preventing the entrance of air except through the ventilating pipe 20 leading into the air heating chamber 19 the eggs cannot possibly be chilled by sudden drafts. The air admitted to the chamber 19 becoming heated and expanded therein passes first to the chamber 11 and thence with currents of heat and moisture into the egg chamber 6, thereby furnishing ventilation to the eggs from the fresh air thus drawn in through the pipe 20 which, however, is thoroughly warmed in the chamber 19 prior to entering the body of the incubator. By this mode of operation all danger of intrusive currents of cold air is avoided and the eggs are thoroughly protected from any liability of becoming chilled during the process of incubation.

The means for automatically regulating the humidity of the heated air within the incubator through the action of a hygroscopic device for controlling the escape of vapor from a hot water tank; the location of this tank below a horizontal shield that deflects the currents of heated moist air laterally in all directions; the fender for equalizing the influx of heat into the egg chamber; the thermostat for automatically controlling the valves that regulate the circulation of hot water between the boiler and the hot water tank or radiator; and the arrangement of the exit flue from the egg chamber in such a manner as to cause the heat to be retained in said chamber under pressure render it possible to maintain within the incubator at all times a uniform, automatically regulated temperature and humidity so that the apparatus will operate as well in winter as in summer. This result is also aided by the construction of the non-conducting walls with which the body of the incubator is provided and by the relative arrangement of the lamp, boiler, connected hot water tank or radiator and the ventilated air heating chamber located above said boiler and below the hot water tank. It will be observed that there are no jacketed flues around the lamp to collect soot and that the hood below the boiler and surrounding the upper part of the lamp chimney while serving to detain the heat in contact with the bottom of the boiler does not offer any obstruction to the free operation of the lamp. One side of the incubator body may be hinged to provide a door 38 for giving access to the interior when required.

The entire apparatus is of simple and inexpensive construction and requires the exercise of no special care or attention while in operation.

What I claim as my invention is—

1. In an incubator, the combination with a casing having non-conducting walls, and a hot water tank located in the lower portion of the casing, of an egg-supporting and heat deflecting diaphragm of greater length and breadth than the tank and supported horizontally above the latter within the said casing to divide the casing into an upper egg chamber and a lower tank containing chamber, said chambers communicating through a passage which surrounds the chamber, substantially as described.

2. In an incubator, the combination with a casing having non-conducting walls, and a hot water tank located in the lower portion of the casing, of an egg supporting and heat deflecting diaphragm supported by the tank within the casing to divide the latter into an upper egg chamber and a lower tank containing chamber, said chambers communicating through a passage which surrounds the diaphragm, a boiler having tubes connecting it with the tank and provided with valves, a thermostat located in the egg chamber above the diaphragm and connected with the valves for regulating the humidity of air in the egg chamber, and a valved flue leading from the egg chamber, substantially as described.

3. In an incubator, the combination with a non-conducting casing or body, of a horizontally arranged shield or deflecting diaphragm dividing the body of the incubator into an upper chamber for reception of eggs and a lower chamber for distribution of heat, said chambers communicating through a passage that surrounds said shield or diaghragm, and a hot water tank located in the lower chamber below the central portion of said shield or diaphragm and provided with a hygroscopically controlled valve for automatically regulating the humidity of the air in the incubator, substantially as described.

4. In an incubator, the combination with a casing or body, and a horizontally arranged shield or deflecting diaphragm dividing the body of the incubator into an upper chamber for reception of eggs and a lower chamber for distribution of heat to the egg chamber through a passage at the sides and ends of said shield, of a hot water tank located in the lower chamber below the central portion of said shield or diaphragm and provided with a hygroscopically controlled valve for automatically regulating the humidity of the air in the incubator and a safety valve through which surplus vapor in the tank is allowed to escape to the atmosphere, substantially as described.

5. In an incubator, the combination with a casing or body inclosing an upper chamber for reception of eggs, a lower chamber for distribution of heat and a passage through which said chambers communicate on all sides, of a hot water tank located in the center of the lower chamber and having in its top an opening controlled by a valve, and a block of hygroscopic material adapted and arranged to have a bearing contact with said valve for the purpose of regulating the escape of vapor into the incubator, substantially as described.

6. In an incubator, the combination with a casing inclosing an upper egg chamber and a lower heat distributing chamber, of a hot water tank or radiator located in said lower chamber, a boiler located below the incubator and communicating with said tank, and an air heating chamber located intermediate the boiler and the bottom of the incubator and provided with an inlet for fresh air and with an outlet or passage for hot air to the heat distributing chamber of the incubator, substantially as described.

7. In an incubator, the combination with a casing inclosing an upper chamber for reception of eggs and a lower heat distributing chamber communicating with the egg chamber on all sides of the incubator, of a fender surrounding the egg chamber on all sides to equalize the influx of heat to the egg chamber, substantially as described.

8. In an incubator, the combination with the incubator body or casing and a horizontal shield or deflecting diaphragm located therein and dividing the same into an upper chamber for reception of eggs and a lower chamber for distribution of heat to the egg chamber through a passage surrounding said shield on all sides, of a hot water tank or radiator located centrally in said lower chamber, and a fender supported on said shield and surrounding the egg chamber, substantially as described.

9. In an incubator, the combination of a non-conducting body or casing inclosing an upper egg chamber and a lower heat distributing chamber, a flue leading centrally from the upper chamber and having its lower end extended down within said chamber, a ventilated air heating chamber located below the incubator and communicating with the heat distributing chamber, a hot water tank located in said heat distributing chamber, a boiler located below the air heating chamber and communicating with said hot water tank, a lamp for heating the boiler and a heat retaining hood attached to the under side of the boiler and surrounding the upper part of the lamp chimney, substantially as described.

In testimony whereof I have hereunto set my hand and affixed my seal in presence of two subscribing witnesses.

JOHN B. HALFIN. [L. S.]

Witnesses:
H. E. GILES,
GEO. S. SCHALLER.